US008859684B2

(12) United States Patent
Chu et al.

(10) Patent No.: US 8,859,684 B2
(45) Date of Patent: *Oct. 14, 2014

(54) STABILIZERS FOR IMPROVED OPEN TIME OF AQUEOUS COATINGS

(75) Inventors: Sung Gun Chu, Hockessin (DE); Dirk Kruythoff, Dordrecht (NL); Tuyen Thanh Nguyen, Newark, DE (US); Willemina Geesien Salomons, Steenbergen (NL)

(73) Assignee: Hercules Incorporated, Wilmington, DE (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/788,344

(22) Filed: Apr. 19, 2007

(65) Prior Publication Data
US 2007/0249780 A1 Oct. 25, 2007
US 2014/0011946 A9 Jan. 9, 2014

Related U.S. Application Data

(63) Continuation-in-part of application No. 11/031,187, filed on Jan. 7, 2005, now Pat. No. 7,550,542.

(60) Provisional application No. 60/793,291, filed on Apr. 19, 2006.

(51) Int. Cl.
| | |
|---|---|
| *C08F 38/02* | (2006.01) |
| *C08F 238/02* | (2006.01) |
| *C08F 16/12* | (2006.01) |
| *C08F 8/00* | (2006.01) |
| *C08F 8/14* | (2006.01) |
| *C08F 20/56* | (2006.01) |
| *C08F 20/02* | (2006.01) |
| *C08F 20/10* | (2006.01) |
| *C08L 71/02* | (2006.01) |
| *C08G 65/00* | (2006.01) |
| *C09D 153/00* | (2006.01) |
| *C09D 7/00* | (2006.01) |
| *C09D 171/02* | (2006.01) |
| *C09D 5/02* | (2006.01) |
| *C09J 153/00* | (2006.01) |
| *C08G 65/334* | (2006.01) |
| *C08G 65/337* | (2006.01) |
| *C08G 65/22* | (2006.01) |
| *C08G 65/331* | (2006.01) |
| *C08G 65/26* | (2006.01) |
| *C08L 53/00* | (2006.01) |

(52) U.S. Cl.
CPC ............ *C08G 65/331* (2013.01); *C09D 153/00* (2013.01); *C09D 7/002* (2013.01); *C09D 171/02* (2013.01); *C09D 5/024* (2013.01); *C09J 153/00* (2013.01); *C08G 65/3346* (2013.01); *C08G 65/337* (2013.01); *C08G 65/22* (2013.01); *C08G 65/2609* (2013.01); *C08L 71/02* (2013.01); *C08L 53/00* (2013.01); *C08G 2650/34* (2013.01)
USPC ...................... 525/328.1; 525/328.9; 525/384; 525/409; 525/329.4; 525/329.7; 525/330.3

(58) Field of Classification Search
USPC .......... 525/328.1, 328.6, 328.9, 329.4, 329.7, 525/330.3, 384, 409
See application file for complete search history.

(56) References Cited

U.S. PATENT DOCUMENTS

| | | | | |
|---|---|---|---|---|
| 4,377,680 | A | * | 3/1983 | Sponseller et al. ........... 528/123 |
| 4,485,211 | A | * | 11/1984 | Okamoto ........................ 525/57 |
| 4,552,908 | A | | 11/1985 | Nicks et al. .................... 523/504 |
| 5,270,380 | A | | 12/1993 | Adamson et al. .............. 524/556 |
| 5,574,127 | A | * | 11/1996 | Sau ................. 528/125 |
| 5,629,375 | A | * | 5/1997 | Jenkins et al. ................. 524/556 |
| 6,040,368 | A | | 3/2000 | Maver et al. ................... 524/110 |
| 6,303,189 | B1 | | 10/2001 | Gray et al. ................. 427/385.5 |
| 6,762,230 | B2 | | 7/2004 | Brandenburger et al. ..... 524/284 |
| 2002/0058753 | A1 | | 5/2002 | Lau et al. ......................... 525/65 |
| 2004/0077904 | A1 | * | 4/2004 | Nagasawa et al. ............. 568/672 |
| 2005/0150418 | A1 | * | 7/2005 | Bakeev et al. ................ 106/14.5 |

FOREIGN PATENT DOCUMENTS

| | | | |
|---|---|---|---|
| EP | 0 062 106 A1 | 10/1981 | ............ C08F 220/18 |
| EP | 0 261 679 A2 | 3/1988 | ................ C07C 8/36 |
| EP | 0 538 571 A3 | 8/1992 | ................ C08F 2/30 |
| EP | 0 593 151 A1 | 7/1993 | ............... C09D 5/02 |
| EP | 1 500 689 A1 | 3/2004 | .......... C09D 133/06 |
| GB | 2 298 427 A | 9/1996 | .......... C09D 133/00 |
| WO | WO 96/31550 | 10/1996 | ............... C08G 3/02 |
| WO | WO 02/32980 A1 | 4/2002 | ............. C08G 18/36 |
| WO | WO 03/037989 A1 | 5/2003 | ............ C08L 101/00 |

OTHER PUBLICATIONS

Society of Plastics Engineers; "Plasticizers"; 2011.*
Marton et al.: "A depth-resolved look at the network development in alkyd coatings by confocal Raman microspectroscopy," Polymer, Elsevier Science Publishers B.V., GB, vol. 46, No. 25, Nov. 28, 2005, pp. 11330-1139.

* cited by examiner

*Primary Examiner* — Karuna P Reddy
(74) *Attorney, Agent, or Firm* — Dunlap Codding, P.C.; Shaorong Chen

(57) ABSTRACT

A stabilizer composition comprising an AB type polymer for use in increasing Open Time of aqueous coating compositions is disclosed. The stabilizers compositions are of utility in many aqueous compositions including paints, stains, varnishes, adhesives and inks. Of particular interest is the use of the stabilizer compositions for in increasing the Open Time of latex paints as well as alkyd emulsion paints.

19 Claims, No Drawings

STABILIZERS FOR IMPROVED OPEN TIME OF AQUEOUS COATINGS

RELATED APPLICATIONS

This application claims the benefit of U.S. Provisional Application Ser. No. 60/793,291, filed on Apr. 19, 2006, which is incorporated herein by reference in its entirety. This application is also a continuation-in-part of U.S. Ser. No. 11/031,187, filed Jan. 7, 2005, now issued as U.S. Pat. No. 7,550,542.

FIELD OF THE INVENTION

The present invention relates to a method of increasing the Open Time of an aqueous coating. More particularly, this invention relates to a method of increasing the Open Time of a coating of a water-borne latex paint using a new stabilizer.

BACKGROUND OF THE INVENTION

Open Time is a property of paint that is of high importance to the painter. It is defined as the maximum time paint can be re-worked prior to demonstrating permanently the deformations brought to the paint, such as brush-marks, etc. Water-borne latex paints are known to suffer from a rather short Open Time in comparison to solvent borne paints. The origin of this difference lies in the fact that the binder in water borne paints is not soluble in the continuous phase (water). However, some improvements can be made to extend the Open Time by addition of co-solvents. The demand for lowering VOC (Volatile Organic Compound) in paint requires other solutions for extending Open Time than the addition of co-solvents.

One of the traditional methods to improve Open Time of paint is to add co-solvents, and coalescing agents. The use of glycols or high-boiling solvents is known. However, this is undesirable in paints intended to meet the Volatile Organic Compound limits that are in place today. Another disadvantage of the addition of addition of solvents is the lowering of block resistance, and dirt pick-up can become a problem. EP 1500589 states that an Open Time of 10 min is considered optimal.

EP1500689A1 publication describe the preparation and composition of a water borne coating of an acrylic latex prepared and stabilized with a protective colloid, pigments and extenders, wetting agents or leveling agents, coalescents, and thickener. The coating composition relies upon the presence of PVOH (polyvinyl alcohol) as stabilizer; also, PVOH copolymerized with ethylene (marketed by Kuraray Co. Ltd.) can be used or partial acetylation of the OH groups. Although intended for solvent free paints, EP 1500689 shows the improved Open Time in a gloss paint contains nearly 10% of coalescing agents and co-solvents (nearly 10% PG (propylene glycol) and Texanol® ester alcohol, available from Eastman Chemicals).

U.S. Pat. No. 6,303,189 discloses the addition of a polyurethane (PU) dispersion to an aqueous coating, where Tg (glass transition temperature) of the polyurethane dispersion is less than that of the latex polymer. The PU dispersions have small particle size (30 nm) and a low Tg (~−50° C.-~−10° C.). Yet the level of co-solvent (propylene glycol) still was roughly 9.4 wt %.

EP 593,151A1 publication describes an improvement in Open Time by developing a latex having still reactable groups, or mix the latex with compounds that have complementary reactable groups.

WO 02/32980 publication demonstrates the preparation and use of a water dispersible (self) crosslinkable polyurethane, having a relatively low molecular weight. This binder crosslinks by various possible chemical reactions.

EP 62,106A1 publication discloses the manufacturing of acrylate latex and styrene-acrylic latex stabilized with PVOH as protective colloid. Preferably, the latex is stabilized without surfactants.

EP 538,571A1 publication discloses the preparation of latex via a surfactant free emulsion polymerization of a selected mixture of monomers with selected PVOHs. This patent does not mention Open Time as a critical parameter to be improved.

U.S. Pat. No. 4,552,908 discloses an improvement of Open Time in paints by using low molecular weight oligomers that are water dispersible film formers, and having coupling moieties.

U.S. Pat. No. 5,270,380 also discloses the use of a binder that has reactable groups.

U.S. Pat. No. 6,040,368 discloses the preparation and use of a latex with acetoacetate, acetoacetamide, cyanoacetate and cyanoacetamide as pendant groups. Also disclosed is the use of polyether monoamine or diamine having primary amine or secondary amine functionality and an alkylpolyglucoside. These polymers are coupled through reaction of the diamine with the acetoacetate to form enamine structures.

U.S. Pat. No. 6,762,230 discloses a coating with coalescent and a latex polymer, in which the coalescent may be reactable.

SUMMARY OF THE INVENTION

This invention relates to a method of increasing the Open Time of a coating. The method comprises the manufacturing and use of additives that prolong the Open Time of water borne paints and may have a degree of rheological functionality.

This invention relates to a stabilizer composition for use in increasing Open Time of an aqueous coating composition comprising an AB type polymer. The B of the AB type polymer may be any type of water-soluble/water dispersible oligomer or polymer. The A of the AB type polymer is covalently connected to B and is a "comb type" of structure that has the following formula:

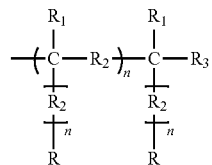

In the above formula, R comprises a $C_1$ to $C_{30}$ hydrocarbon, which may be linear or branched, aliphatic or aromatic or combinations thereof. $R_1$ may be H, $CH_3$, or $C_2H_5$. $R_2$ may be $CH_2O$, $CO_2$, $CONH$, or $CH_2$. The identity of the $R_2$ can be the same or different in each occurrence of the AB type polymer. $R_3$ may be either an H or OH. The "n" denotes an integer from 1 to 100. The "m" may be either 0 or 1.

The aqueous coating composition which the stabilizer of the present invention may be used can selected from the group consisting of paints, stains, varnishes, adhesives and inks.

The stabilizers of the present invention are particularly suitable for use in increasing the Open Time in architectural latex paint, but may also be employed in alkyd emulsion paints to increase its Open Time.

DETAILED DESCRIPTION OF THE INVENTION

It has been surprisingly found that Open Time in paints can be significantly increased by using a stabilizer of the present invention. This stabilizer may be made at a preliminary stage in the paint manufacturing process or it may be added after the paint has been formulated thereby overcoming the necessity of requiring the stabilizer to be already in the latex preparation stage. Thus, it is easier and more versatile to use. It also shows the benefits in truly solvent free paints where Open Time is a problem.

The stabilizer composition of the present invention is of use in increasing Open Time of an aqueous coating composition and is an AB type polymer. The "B" segment of the AB type polymer may be any type of water-soluble/water dispersible oligomer or polymer. The B segment may be selected from the group consisting of polyethylene glycol, polyactalpolyether (PAPE), acrylate, acrylamide and polyethylene oxide. A preferred "B" of use in the present invention is polyethylene glycol. Another preferred "B" of use in the present invention is polyactalpolyether (PAPE). The polyethylene glycols that are of use in the stabilizers of the present invention may be selected from the group consisting of monomethylpolyethylene glycol and hydroxypolyethylene glycol. The polyethylene glycol may be a methoxy-end-capped polyethylene glycol. The "B" of use in the present invention may be a mono functional oligomer.

The "A" of the AB type polymer is covalently connected to "B" and has the following formula:

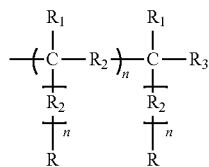

In the above formula, R comprises a $C_1$ to $C_{30}$ hydrocarbon, which may be linear or branched, aliphatic or aromatic or combinations thereof. $R_1$ may be H, $CH_3$, or $C_2H_5$. $R_2$ may be $CH_2O$, $CO_2$, $CONH$, or $CH_2$. The identity of the $R_2$ can be the same or different in each occurrence of the AB type polymer. $R_3$ may be either an H or OH. The "n" denotes an integer from 1 to 100. The "m" may be either 0 or 1.

The "A" may be selected from the group consisting of polyphenoxy glycidyl ether, methylphenyl glycidyl ether, ethylhexylglycidyl ether, phenyl glycidyl ether, and alkali glycidyl ether. Preferably the "A" is methylphenyl glycidyl ether or ethylhexylglycidylether.

The stabilizers of the present invention are of particular use in increasing the Open Time in aqueous compositions. In addition to the stabilizer, the aqueous compositions also contain a film-forming polymer. In many architectural paints, the film-forming polymer is a latex. In other end uses, the film-forming polymers may be used and selected from the group consisting alkyl acrylates, alkoxy acrylates, alkyl methacrylates, alkoxy methacrylates, vinyl esters of saturated carboxylic acids monoolefins and conjugated dienes.

The film-forming polymer typically contains at least one ethylenically unsaturated monomer. This ethylenically unsaturated monomer may be selected from the group consisting of acrylic acid, methacrylic acid, butyl acrylate, methyl methacrylate, 2-ethylhexyl acrylate, acrilic esters, styrene, vinyl ethers, vinyl and vinylidene halides, N-vinyl pyrrolidone, ethylene, propylene or greater alpha-olefins, allyl amines, allyl esters of saturated monocarboxylic acids and amides thereof, allyl acetate, allyl propionate, allyl lactate, their amides, mixtures thereof and mixtures thereof.

These stabilizers are useful by post-addition in the paint, but are not restricted to addition in this stage, i.e. these additives might also be employed in the pigment paste preparation (grinding stage), in preparing the aqueous continuous phase, and also can be employed as stabilizer in preparing the latex. Therefore, the stabilizer composition may be added to the aqueous solution before the film-forming polymer is dispersed or emulsified in the aqueous solution, after the film-forming polymer is dispersed or emulsified or at the same time the film-forming polymer is dispersed or emulsified.

The dosage level at which these stabilizers work is extremely low, in contrast to the use of co-solvents, that require a high dosage level before showing apparent differences in Open Time. The stabilizer composition of the present invention may bu used at dosage levels of above about 0 to about 10 wt % of the aqueous coating composition, preferably about 0.1 to about 3 wt %, more preferably 0.5 to about 1 wt % of the aqueous coating composition.

The invention is based on the concept of delaying the film formation of binder particles or film-forming polymers in the paint by improving their stability toward coalescence and coagulation. This was already noted as being the major driving force behind Open Time.

These stabilizers contain a moiety that has a very high affinity for the latex particles and another part that is highly soluble in the continuous phase of the paint formulation.

The high affinity for latex part is chemically constructed in such a way that desorption from the latex is extremely unlikely. Thus, the stabilizer of the present invention may be viewed as being irreversibly adsorbed to the latex particle.

The stabilizers of this invention can be used as post-stabilizers but also may be employed as thickener for the paint thereby affecting the paint's rheological properties and may stabilize the paint during production of the paint. When employed as thickener, these chemicals described in the inventions serve to prolong Open Time of paint.

The stabilizers of the present invention are of utility in may be used in many aqueous compositions selected from the group consisting of paints, stains, varnishes, adhesives and inks. Of particular interest, is the use of the stabilizers of the present inventions in increasing the Open Time of latex paints. The stabilizers of the present invention are also of utility in increasing the Open Time of alkyd emulsion paints.

One of the advantages of the current invention is the applicability in various systems. The additives described in this invention can be used in the latex preparation, in the paint preparation as thickener, and as post additive after complete paint is prepared. Also, combinations of the use are possible. One advantage of this invention is in creating excellent stability of the binder articles in the system (either during latex manufacturing, or as post stabilizer), most probably due to a very good adsorption on the latex. This is one of the major advantages over the use of regular surfactants that tend to desorb whenever this is more energetically more favorable.

The stabilizers of the present invention may be used as surfactants, dispersants, encapsulants, stabilizers for emulsion polymerization and of alkyd emulsions as well as other dispersions.

The aqueous compositions are typically formulated with other components to impart desired properties on the product in use as well as the final product. These additional components may be selected from the group consisting of pigments, fillers, thickeners, biocides, mildewcides, surfactants, dispersants and defoamers.

DEFINITIONS

"Open Time": the length of time a coating remains wet enough to allow for brushing in at the laps, synonymous to Wet Edge time.

"Wet edge": the edge of a wet painted area which remains workable.

The examples are merely set forth for illustrative purposes, but it is to be understood that other modifications of the present invention can be made by skilled artisans in the related industry without departing from the spirit and scope of the invention. The parts and percentages used in the examples being by weight unless otherwise indicated.

Examples 1, 2, 3, 4 and 5 are presented to describe the synthesis routes for preparing the stabilizers of the present invention.

Example 1

As shown, the stabilizer is of the AB type, where the composition of the B was polyethylene oxide, A was polyphenoxy glycidyl ether an the stabilizer was produced according to the below Scheme 1.

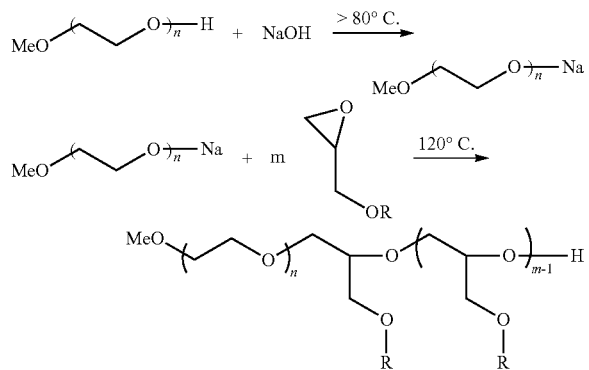

A mixture of PEG-Monomethyl (Mw=5 K, 41.5 g), NaOH (0.7 g) was heated to 80° C. for 1 hour, methylphenyl glycidyl ether (7.0 g) was added. The mixture was heated at 120° C. for 8 hours. The product was dissolved in toluene (200 mL) and precipitated in hexane (600 mL) giving a solid (45 g) after washing and drying. It was designated 1A.

Similarly, another composition of polyphenyl glycidyl ether comb with PEG-O-Me was made from PEG-O-Me (60 g), NaOH (1 g) and phenyl glycidyl ether (12.5 g). The product was designated as 1B.

In the above experiments, the comb material was made from a mono-functional PEG oligomer. It is also convenient to make this mono functional oligomer through a hydrolysable multi-functional oligomer. The hydrolysable linkage could be an acid-sensitive connective groups, such as acetal, ester, or a base sensitive connective groups, such as carbonate, ester, or amide.

Example 2

The following examples show hydroxy-PEG-polyhydrophobe oligomers made by hydrolysis of telechelic-polyhydrophobe-PEG-acetal oligomers.

Hydroxy-PEG (4K)-polyphenyl glycidyl ether was used in the production of stabilizer material.

A mixture of PEG (4K, 60 g), NaOH (1.3 g) was heated to 80° C. for 1 hr. Dibromomethane was added (1.3 g) and the reaction mixture was continued at 80° C. for 2 hr. Methylphenylglycidyl ether (4 g) was added. The reaction was kept at 120° C. for 4 hr. After cooled down to 80° C., 50 mL of toluene, $H_2SO_4$ (3 mL, 3M) and water (3 mL) were added and the mixture was stirred for 4 hr. The product was isolated by precipitation in hexane (500 mL) and by soaking in IPA (500 mL). After drying, 62 g of material was collected. SEC gave 90% mono-capped material. $^1$H NMR indicated that the material has 5% hydrophobe by weight. The product was designated as 2A.

Hydroxy-PEG (8K)-polyphenyl glycidyl ether was used in the production of stabilizer material.

A mixture of PEG (8K, 60 g), NaOH (1.3 g) was heated to 80° C. for 1 hr. Dibromomethane was added (0.65 g) and the reaction mixture was continued at 80° C. for 2 hr. Methylphenylglycidyl ether (4.25 g) was added. The reaction was kept at 120° C. for 4 hr. After cooled down to 80° C., 50 mL of toluene, $H_2SO_4$ (3 mL, 3M) and water (3 mL) were added and the mixture was stirred for 4 hr. The product was isolated by precipitation in hexane (500 mL) and by soaking in IPA (500 mL). After drying, 63 g of material was collected. SEC gave 80% mono-capped material. $^1$H NMR indicated that the material has 5% hydrophobe by weight. The product was designated as 2B.

Hydroxy-PEG (20K)-polyphenyl glycidyl ether was used in the production of stabilizer material.

A mixture of PEG (20 K, 53 g), NaOH (1.3 g) was heated to 80° C. for 1 hr. Dibromomethane was added (0.23 g) and the reaction mixture was continued at 80° C. for 2 hr. Methylphenylglycidyl ether (7 g) was added. The reaction was kept at 120° C. for 4 hr. After cooled down to 80° C., 50 mL of toluene, $H_2SO_4$ (3 mL, 3M) and water (3 mL) were added and the mixture was stirred for 4 hr. The product was isolated by precipitation in hexane (500 mL) and by soaking in IPA (500 mL). After drying, 57 g of material was collected. SEC gave 85% mono-capped material. $^1$H NMR indicated that the material has 7.9% hydrophobe by weight. The product was designated as 2C.

Other examples were produced using similar methods as above examples 2A, 2B and 2C. These one example is described as comprising PEG (12K)/PGME (60 g/14 g), estimated to comprise 30% double combs in the "A" section of the polymer. This product was designated as 2D. Another example is described as comprising PEG (20K)/PGME (60 g/14 g), estimated to comprise 30% double combs in the "A" section of the polymer. This product was designated as 2E. Another example is described as comprising PEG (12K)/PGME (60 g/4 g), estimated to comprise 30% double combs in the "A" section of the polymer. This product was designated as 2F. Another example is described as comprising PEG (20K)/PGME (60 g/4 g), estimated to comprise 30% double combs in the "A" section of the polymer. This product was designated as 2G.

Example 3

Preparation of Various Stabilizers of the Present Invention; 3A; 3B; 3C; 3D; 3E; 3F; 3G; 3H and 3I The reaction was carried out in a 500 ml 3-neck round bottom flask, which was equipped with a temperature controlled heating mantle, thermo-couple, reflux condenser (on top connected with gas bubbler to visualize gas-flow), rubber septum to inject chemicals, nitrogen inlet, stirrer motor, glass stirrer rod with removable Teflon blade, gas seal and bearing.

PEG 8K or PEG 10K (60 g) and NaOH (1.23 g) were blended under $N_2$ blanket and heated to 80° C. and kept for 15 min. while stirring in order to dissolve the NaOH. The products 3A and 3C were made using methoxy-end-capped PEG (mono capped) instead of regular PEG. The product 3H, was similar to 3A except that it comprises 16% MPGE by weight instead of 17% MPGE found in 3A.

The crosslinker (preheated at 50° C.) DBM (dibromomethane) was added by syringe via the septum; the amount DBM used was exactly 0.5 mole of the PEG used. The mixture was kept at 80° C. for 1 hour in order to react. The products 3A and 3C were made without this coupling step. In the 3B, 3D, 3E, and 3F products, dibromomethane was used. In the preparation of 3B and 3G, 10 ml of toluene were added after reaction with dibromomethane.

After reaction, the hydrophobic reagent (e.g. alkali glycidyl ether) was injected via the septum, in an amount of 7.58 gram (=12 wt %) MPGE or 10.2 g (=17 wt %) MPGE or 11.57 g (=15% EHGE, ethylhexylglycidyl ether). The temperature was raised to 120° C. and kept at that temperature for 2 hours. After reaction, the temperature was decreased to 100° C.

For the hydrolysis step, $H_2SO_4$ 1.5 M (about 12 ml) was added, and allowed to react for 4 hours. The product 3I was solid HM-PAPE ($C_{16}$-PAPE) which was hydrolyzed.

The procedure after hydrolysis depended of the presence of toluene in the reaction mixture.

In the case when no toluene was present, the reaction mixture was poured into an aluminum pan and cooled down to room temperature. The product was scooped out of the pan and was further purified.

When toluene was present, an additional 100 g of toluene was added to the reaction mixture. The temperature was kept at 80° C. for 15 minutes. Upon stirring, the mixture was cooled down to room temperature.

The reaction mixture was decanted and precipitated in 200 g of hexane and further purified.

The purification of the product was carried out as follows: The precipitate in hexane was filtrated under "vacuum" using a Buchi-funnel equipped with a S&S rundfilter $589^3$ Ø90 mm Ref. no. 300209. After filtration the residue was scooped out of the funnel, ground in a mortar, and put back again in the Buchi-funnel. The residue was then washed with totally 100 g ethyl acetate (EA) as follows: The EA was added until all reaction product was covered by liquid, then filtering was carried out under atmospheric conditions until the residue had a 'dry' appearance, then a very low "vacuum" (1000 mbar) was applied until the bulk of the liquid was passed. Then full vacuum was applied until all liquid was passed. This procedure was repeated until all EA was used. After this, the same wash procedure was carried out with hexane. The product was further dried for 12 hr at 45° C.

Example 4

PEG 4K (12 g) and PEG 5K (45 g) and NaOH (2.88 g) were blended under $N_2$ blanket and heated to 80° C. to let the PEG melt. The mixture was kept at 80° C. and 2.16 g of pre-heated (50° C.) trimethylolpropanenethoxylate (TMPE) was added through injection. The mixture was kept at 80° C. for 1 hour in order to react. The crosslinker, preheated at 50° C., DBM (2.08 gram in 15 ml toluene) was added by syringe via the septum. The mixture was kept at 80° C. for 1 hour in order to react. After reaction, the hydrophobic reagent (e.g., alkali glycidylether) was injected via the septum in an amount of 10.13 grams (=16 wt %) MPGE or 9.33 (=14 wt %) EHGE (ethylhexylglycidylether) or 10.67 g (=16 wt % EHGE). The temperature was raised to 120° C. and kept at that temperature for 2 hours. Another 100 grams of toluene was added and the reaction mix was decanted and precipitated in 200 g hexane. The precipitate in hexane was further purified as described above.

Example 5

Preparation of Various Stabilizers (Invention)

The reaction steps to produce the samples 5A, 5B, 5C, 5D, 5E are set forth below and were produced according to the below schematic representation.

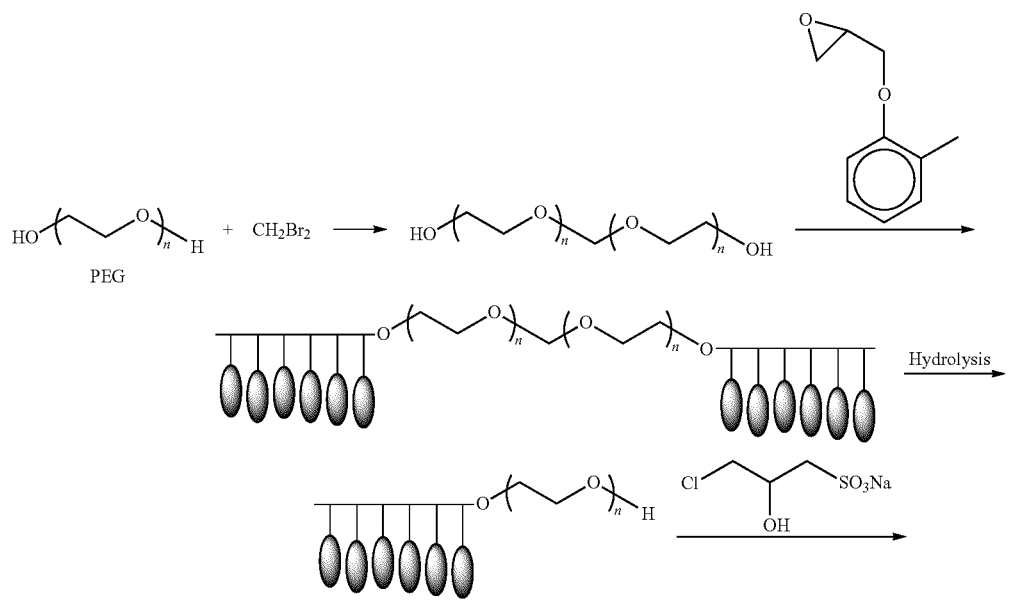

-continued

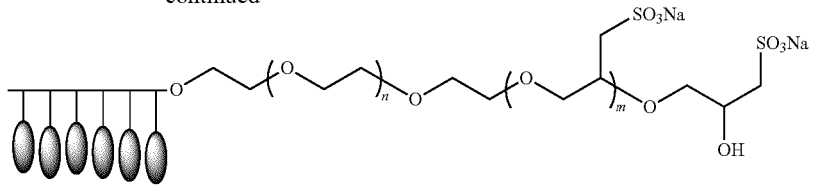

Compositions of stabilizers produced in Examples 1-5 are listed below in Table 1.

TABLE 1

| Designation | Chemical Description |
|---|---|
| 1A | MPEG (5K)/PGME (41.5 g/7 g) single chain comb NaOH 0.7/45 |
| 1B | MPEG (5K)/PGME (60 g/12.5 g) single chain comb 1 g/70 |
| 2D | PEG (12K)/PGME (60 g/14 g) estimated 30% double combs |
| 2E | PEG (20K)/PGME (60 g/14 g) estimated 30% double combs |
| 2F | PEG (12K)/PGME (60 g/4 g) estimated 30% double combs |
| 2G | PEG (20K)/PGME (60 g/4 g) estimated 30% double combs |
| 3A | Linear 5K 17% MPGE |
| 3B | Linear 8K 12% MPGE |
| 3E | Linear 15K 12% MPGE |
| 3C | Linear 10K 12% MPGE |
| 3D | Linear 8K 12% MPGE |
| 4A | Branched 6K 16% MPGE |
| 4B | Branched 6K 14% C8 |
| 4C | Branched 6K 16% C8 |
| 3H | Linear 5k 16% MPGE |
| 3G | Linear 5k 16% C8 |
| 3E | Linear 10K 12% MPGE |
| 3I | Linear 8k unknown % C16 |
| 5E | MPGE-PEG 4K SO$_3$Na |
| 5D | MPGE-PEG 12K SO$_3$Na |
| 5A | MPGE-PEG 12K |
| 5B | MPGE-PEG |
| 5C | MPGE-PEG SO$_3$Na |

Example 6

Use of the Stabilizer Polymer Materials as Additives in Water Borne Latex Paints This Example 6 describes the use of the stabilizer polymers of the present invention as additives in various water borne paint formulations.

The stabilizers were added to the paint formulation after preparing the complete paint. Mixing and equilibrating of the paint+stabilizer was carried out by gentle tumbling overnight (A&D paints).

The paints were individually prepared. The additive was dissolved in water in high concentrations prior to addition to the paint, and mixed for 1 hour with the base paint, by using a Caframo type RZR1 laboratory mixer fitted with a 2-inch diameter, 3-vane propeller blade. The paint was subsequently thickened by using an amount of thickener that without the stabilizer would have resulted in a paint viscosity of 100 KU viscosity.

Of all paints the Open Time was evaluated according to the following procedures:

Open Time X-test A&D:

A 100 μm or 200 μm drawdown of the test paint is applied on a Leneta scrub test panels (form P121-10N). Immediately after drawing down the paint, eight X-shaped crosses were made in the film. The "X"s were drawn using an eraser from the head of a pencil. The "X" should be made so that no paint is visible on the drawdown card at a width of 5 mm. Prior to recoating of "X"s, the paint brush (Copenhagen Gold Marine #16) was prepared. The preparation of the brush was accomplished by coating the brush with paint to be tested and then applying paint to a drawdown card with a minimum of twenty strokes. Depending on the expected Open Time, the first recoating of an "X" was started between 1 and 10 minutes after the wet film application. Just before recoating 0.6 g paint was applied in the center of the "X". This recoating was accomplished with a minimum of 20 strokes or until the brush drag increased due to severe resistance of the brush.

The same procedure was then repeated every 2 minutes until the "X" stayed visible through the fresh paint.

After the test was completed, the test panel was allowed to dry overnight.

Open Time X-test RC

A 10 mil drawdown of the test paint was applied on a plain block Leneta scrub chart. Immediately after drawing down the paint, six X-shaped crosses were made in the film using the eraser head of a pencil. The "X" was made so that no paint was visible on the drawdown card at a width of one-quarter inch. Prior to recoating of "X"s, the paint brush (1½" brush) was prepared. The preparation of the brush was accomplished by coating the brush with paint to be tested and then applying paint to a drawdown card with a minimum of twenty strokes. Following preparation of the brush, the brush was once again loaded with fresh paint to the point of just being wet. Three minutes after the wet film application, step A, the first recoating of an "X" was performed. This recoating was accomplished with a minimum of 20 strokes or until the brush drag increased due to severe resistance of the brush.

The same procedure was then repeated every minute until the workability was not realistic anymore due to setting-up of the first applied layer. Between these two minute intervals, the paint brush was covered in aluminum foil to reduce the risk of drying. After the test was completed, the test panel was allowed to dry overnight.

The results of enhancement in Open Time upon using the invention as additive are set forth in Tables 3, 4, 5, 6, and 10.

Open Time Test Method

Materials needed for Open Time testing:
Paints to be examined
Glass plate or other apparatus for making drawdowns
Leneta Standard Range Anti-Sag Meter (3-12 mils)
Leneta Plain Black Drawdown Chart (Form BH)
Stopwatch or other timing device
Plastic transfer pipettes (for transferring paint to Leneta chart)
1½ inch wide paint brush
Adhesive tape 1. The tape was used to secure the Leneta BH chart to a flat, level surface in preparation for paint drawdown and testing. These charts were larger than the opacity charts typically used for drawdowns.
2. The test paint was drawn down using the Standard Range Anti-Sag Meter, down the middle of the chart lengthwise.

3. The stopwatch was started immediately after the drawdown had been made. The test was performed in one-minute intervals.
4. After one minute had passed on the stopwatch, the paint brush was dipped into the test paint and applied across the stripes of paint made by the anti-sag meter. The paint was brushed on from the 12-mil stripe to the 3-mil stripe (right to left), for a total of 20 strokes.
5. Step 3 was repeated at two minutes, three minutes, etc, until there is no longer room for another stripe to be painted across the chart. This usually happened after 6 or 7 stripes had been painted.
6. The stopwatch was turned off after final stripe had been painted on the Leneta chart.
7. The tape was removed from the Leneta chart and Leneta chart from drawdown area.
8. The newly painted chart was allowed to dry overnight at ambient conditions before evaluating.
9. The endpoint was considered to be at what time a narrow ridge of dried paint was visible on the right edge of the 5-mil strip of paint. This varied from paint to paint. The ridge should be a complete and unbroken line through the brushed-out area of paint.

Notes on Procedure:

10. If no endpoint was visible after 7 minutes had elapsed, another Leneta chart was prepared for the test paint by following Steps 1-3, above. However, the painting was begun across the drawdown at 7 minutes, rather than 1 minute. Continued painting strips in one-minute intervals as per the original procedure outlined above. This variant will take Open Times out to 13 minutes, which usually is sufficient to determine an endpoint.

A replicate series of paint samples/drawdowns can be used to determine an average value for Open Time. A minimum of two charts is recommended; however, for screening purposes, one chart may be satisfactory. Use pass controls or fail controls as required if testing different formulations of a given paint type.

Comparative Example 1

Use of regular surfactants and cosolvents additives in water borne latex paints as a comparison to the stabilizers of the present invention are described.

The procedure was followed as described in Example 6 with the exception that now a regular surfactant or co-solvents were employed as additive in place of the stabilizers of the present invention. The results of Open Time measurements are mentioned in Tables 14 and 15.

Example 7

Use of the stabilizers of the present invention as rheology modifiers in water borne latex paints is described.

Paints were prepared according to the formulations mentioned in Table 2. The stabilizers of the present invention were employed as rheology modifier. In Table 7, 8, 9, 11, 12 and 13, data are presented showing the performance of these paint formulations.

Example 8

Use of the stabilizers of the present invention as additives in water borne alkyd emulsion paint formulations is disclosed.

The results of enhancement in Open Time upon using the stabilizer of the present invention as additive are mentioned in Table 10.

Furthermore these materials may be used as post-additive in water borne coatings. Also these compounds can be used as rheology modifier in water borne coating thus serving dual functions.

TABLE 2

Paint formulations used

A&D Semi-gloss paint with VOC free acrylic latex:

| Ingredient | parts by weight |
| --- | --- |
| water | 56 |
| AMP 90 | 2 |
| Dispex GA 40 | 6 |
| Dehydran 1293 | 5 |
| Preventol D7 | 2 |
| Tioxide RHD2 | 179 |
| Omyacarb CL extra (disperse 20 min 4000 t) | 79 |
| Surfynol 104E | 6 |
| Neocryl XK 96 | 501 |
| Dehydran 1293 | 9 |
| Thickener | x |
| Water | 155 |
| Total | 1000 |

A&D solvent free PVC 70 flat paint:

| Ingredient | parts by weight |
| --- | --- |
| water | 164 |
| Calgon N | 3 |
| Lopon 894 | 3 |
| Agitan 315 | 3 |
| Tioxide TR-92 | 100 |
| China-Clay Speswhite | 50 |
| Polestar 200 P | 50 |
| Omyacarb 2 GU | 264 |
| Micro Talc WT 1 | 47 |
| Agitan 315 | 1 |
| Prevantol D7 | 2 |
| Water | 25 |
| Mowilith LDM 1871 | 158 |
| Thickener | x |
| Water | 130 |
| Total | 1000 |

Vinyl-Acrylic (UCAR 379G) interior semi-gloss pastel base paint (57 g/l VOC):

| Designation | Ingredient | parts by weight |
| --- | --- | --- |
| Grind | Water | 140.0 |
| Hegman >6 | Propylene glycol | 8.0 |
| | Texanol | 5.0 |
| | Tamol 731A | 10.0 |
| | Tergitol NP-9 | 3.0 |
| | AMP-95 | 2.5 |
| | Drew Plus I-475 | 2.0 |
| | Ti-pure R-900 | 200.0 |
| | Polygloss 90 | 50.0 |
| Letdown | Drew Plus L-475 | 2.0 |
| Hold | Latex | 400.0 |
| | Thickener & Water | 200.0 |
| | Total | 1022.5 |

| Paint properties: | % PVC: 27.1 | % Vol solid: 31.7 |
| --- | --- | --- |
| | % coalescent: 6.8 | % volatile: 53.06 |
| | % water 51.54 | VOC (g/l): 56 |
| | Density, lbs/gallon: 10.56 | |

25 PVC Zero VOC interior semi-gloss paint

| Designation | Ingredient | parts by weight | Ingredient | parts by weight |
| --- | --- | --- | --- | --- |

TABLE 2-continued

Paint formulations used

| Grind | | | | | |
|---|---|---|---|---|---|
| | Water | 136.3 | Water | 136.3 | |
| | Tamol 731A | 12.0 | Tamol 731A | 12.0 | |
| | Ammonia | 2.5 | Ammonia | 2.5 | |
| | Strodex PK-90 | 2.0 | Strodex PK-90 | 2.0 | |
| | Trition CF-10 | 2.0 | Trition CF-10 | 2.0 | |
| | Drew Plus L-475 | 1.5 | Drew Plus L-475 | 1.5 | |
| | Proxel GXL | 1.5 | Proxel GXL | 1.5 | |
| | Ti-pure R-706 | 230.0 | Ti-pure R-706 | 230.0 | |
| | Atomite | 30.0 | Atomite | 30.0 | |
| | Attagel 50 | 5.0 | Attagel 50 | 5.0 | |
| Hold | UCAR 300 | 452.0 | Optive 130 | 497.2 | |
| | Drew Plus L-475 | 3.0 | Drew Plus L-475 | 3.0 | |
| | Thickener & Water | 151.5 | Thickener & water | 106.3 | |
| | Total | 1061.5 | Total | 1061.5 | |

Paint properties: % PVC: 24.8  % Vol solid: 35.0  % weight solids: 48.6
Density, lbs/gallon: 10.6  VOC (g/l): <1

For a <50 g/l VOC paint to each paint (1061.5 parts) 18.0 parts of ethyleneglycol was added.

Vinyl-Acrylic (UCAR 300) Interior Flat Paint (PVC 60):

TABLE 3

Open Time of A&D semi gloss paint upon post-addition of stabilizer additive

| Paint code | Thickener used in paint | Sample code added stabilizer | % added stabilizer (weight on total paint) | Open Time (min), conditions (C., % RH) | Brookfield viscosity (mPa · s) |
|---|---|---|---|---|---|
| TK 070604 C | Aquaflow ® NLS 200 rheological modifier | none | 0 | 5 (20° C., 60% RH) | 2250 |
| TK 070604 C | Aquaflow ® NLS 200 rheological modifier | none | 0 | 4 (21° C., 60%) | |
| TK 070604 C | Aquaflow ® NLS 200 rheological modifier | none | 0 | 3.75 (22° C., 60%) | |
| TK 070604 C | Aquaflow ® NLS 200 rheological modifier | 1A | 0.1 | 3.5 (22° C., 60%) | |
| TK 070604 C | Aquaflow ® NLS 200 rheological modifier | 1A | 0.5 | 5 (22° C., 60%) | |
| TK 070604 C | Aquaflow ® NLS 200 rheological modifier | 1A | 1 | 8 (21° C., 60%) | 1900 |
| TK 070604 C | Aquaflow ® NLS 200 rheological modifier | 1A | 2.5 | 8 (21° C., 60%) | 2300 |
| TK 070604 C | Aquaflow ® NLS 200 rheological modifier | 1A | 5 | 8 (21° C., 60%) | 2000 |
| TK 080604 E | Natrosol ® 250 HBR HEC | none | 0 | 3 (20° C., 60% RH) | 9500 |
| TK 080604 E | Natrosol ® 250 HBR HEC | none | 0 | 3.5 (21° C., 60%) | |
| TK 080604 E | Natrosol ® 250 HBR HEC | none | 0 | 4.5 (22° C., 60%) | |
| TK 080604 E | Natrosol ® 250 HBR HEC | 1B | 0.1 | 5.5 (22° C., 60%) | |
| TK 080604 E | Natrosol ® 250 HBR HEC | 1B | 0.5 | 6.5 (22° C., 60%) | |
| TK 080604 E | Natrosol ® 250 HBR HEC | 1B | 1 | 6 (21° C., 60%) | 8000 |
| TK 080604 E | Natrosol ® 250 HBR HEC | 1B | 2.5 | 6 (21° C., 60%) | |
| TK 080604 E | Natrosol ® 250 HBR HEC | 1B | 5 | 6 (21° C., 60%) | 7900 |

Aquaflow ® NLS 200 rheological modifier is available from Hercules Incorporated.
Natrosol ® 250 HBR hydroxyethylcellulose is available from Hercules Incorporated.

TABLE 4

Open Time of A&D semi gloss paint upon post-addition of 1 wt % stabilizer additive

| Product code | Product composition | Open Time (min) | Conditions (RH(%), T(° C.)) | Stormer viscosity (KU) | ICI viscosity (cP) | Leneta leveling | NYPC leveling | Sag resistance (μm) |
|---|---|---|---|---|---|---|---|---|
| none | — | 4.5 | 60%, 20° | — | 95 | 9 | 5 | 350 |
| 3A | Lin 5K 17% MPGE | 7 | 60%, 20° | 81 | 60 | 9 | 5 | 300 |
| 3B | Lin 8K 12% MPGE | 7 | 60%, 20° | >150 | 220 | 1 | 1 | 600 |
| none | — | 4.5 | 55%, 20° | 102 | 95 | 9 | 5 | 350 |
| 3D | Lin 15K 12% MPGE | 6.5 | 55%, 20° | — | 85 | 9 | 5 | 300 |
| 3E | Lin 10K 12% MPGE | 6.5 | 55%, 20° | 108 | 110 | 9 | 5 | 350 |
| 3F | Lin 8K 12% MPGE | 7 | 55%, 20° | — | 110 | 9 | 5 | 350 |
| none | — | 5 | 55%, 21.5° | 102 | — | — | — | — |
| 4A | Brnch 6K 16% MPGE | 6.5*) | 55%, 21.5° | 89 | — | — | — | — |
| 4B | Brnch 6K 14% C8 | 6.5 | 55%, 21.5° | — | — | — | — | — |
| 4C | Brnch 6K 16% C8 | 6.5 | 55%, 21.5° | — | — | — | — | — |
| 4A | Brnch 6K 16% MPGE | 7.5 | 55%, 21.5° | 89 | — | — | — | — |
| None | — | 4.5 | 55%, 21° | — | — | — | — | — |
| 3G | Lin 10K 12% MPGE | 7 | 55%, 21° | — | — | — | — | — |
| 3I | Lin 8K C16 | 7 | 55%, 21° | — | — | — | — | — |
| 3C | Lin 5K 15% C8 | 6.5 | 55%, 21° | — | — | — | — | — |

*0.5 wt % used instead of 1 wt %

TABLE 5

Open Time of A&D PVC 70 flat paint upon post-addition of stabilizer additive

| Product code | Product Composition | Open Time (min) | Conditions (RH(%), T(° C.)) |
|---|---|---|---|
| None | — | 4.5 | 55%, 21.5° |
| 5C | MPGE-PEG 4K SO₃Na | 6 | 55%, 22° |
| 5B | MPGE-PEG 12K SO₃Na | 5.5 | 55%, 22° |
| 5A | MPGE-PEG 12K | 5.5 | 55%, 22° |
| None | — | 4 | 55%, 21° |
| 5D | MPGE-PEG | 5 | 55%, 21° |
| 5E | MPGE-PEG SO₃Na | 5.6 | 55%, 21° |
| 5C | MPGE-PEG 4K SO₃Na | 6.5 | 55%, 21° |

TABLE 6

Open Time of RC 0-VOC semi gloss paint (PVC 25) upon post-addition of stabilizer additive

| Latex used in paint | Thickener used in paint | Sample code added stabilizer | % added stabilizer (weight on total paint) | Open Time (min), conditions (F., % RH) | Stormer viscosity (KU) | ICI viscosity (Poise) |
|---|---|---|---|---|---|---|
| Optive 130 | Aquaflow ® NLS 200 rheological modifier | none | 0 | 1.5 (73 F., 50% RH) | 109 | 0.53 |
| Optive 130 | Aquaflow ® NLS 200 rheological modifier | 1A | 1.5 | 3.5 (73 F., 50% RH) | 84 | 0.65 |
| Optive 130 | Aquaflow ® NLS 200 rheological modifier | 1B | 1.5 | 3 (73 F., 50% RH) | 87 | 0.60 |
| UCAR 300 | Natrosol ® 250 MBR HEC | none | 0 | 1.5 (73 F., 50% RH) | 103 | 0.62 |
| UCAR 300 | Natrosol ® 250 MBR HEC | 1A | 0.95 | 3 (73 F., 50% RH) | 107 | 0.80 |
| UCAR 300 | Natrosol ® 250 MBR HEC | 1B | 1.5 | 4 (73 F., 50% RH) | 94 | 0.90 |

Natrosol ® 250 MBR hydroxyethylcellulose is available from Hercules Incorporated.

TABLE 7

Open Time of RC semi gloss pastel base with UCAR 379G latex, 57g/l VOC paints having the Stabilizer additives as single paint thickener

| Thickener code | Carrier for thickener | TE (wt %) | Stormer viscosity (KU) | ICI viscosity (Poise) | Open Time (min) | Leveling |
|---|---|---|---|---|---|---|
| X33487-95BC | Water/Butylcarbitol (75/25) | 1.47 | 98 | 1.254 | 8 | 5 |
| Aquaflow ® NLS 200 rheological modifier | Water/Butylcarbitol (80/20) | 0.58 | 101 | 1.19 | 5.5 | 6 |

TABLE 8

Open Time of RC 25 PVC Zero VOC interior semi-gloss paint based on UCAR 300, having the Stabilizer additives as single paint thickener

| Stabilizer | TE (wt %) | Stormer viscosity (KU) | ICI viscosity (Poise) | 60° gloss | Sag resistance | Leneta Leveling | Open Time (min) |
|---|---|---|---|---|---|---|---|
| Aquaflow ® NLS 200 rheological modifier | 0.46 | 100 | | | | | 2 |
| MBR | 0.68 | 101 | 0.6 | 43.3 | 16 | 1 | 1 |
| 2G | 1.99 | 103 | 2.5 | 34.5 | 8 | 10 | 5 |
| 2F | 2.07 | 101 | 2.3 | 33.6 | 6 | 10 | 5.5 |
| 2E | 0.56 | 107 | 0.5 | 46.6 | 24+ | 5 | 3 |
| 2D | 0.42 | 98 | 0.3 | 42.7 | 24+ | 6 | 3 |

TABLE 9

Open Time of RC 25 PVC Zero VOC interrior semi-gloss paint based on UCAR 300, having the Stabilizer additives as rheology modifier in combination with Aquaflow NLS 200

| Stabilizer | Wt % Stabilizer on paint | Wt % NLS 200 on paint | Stormer viscosity (KU) | Open Time (min) | Open Time (min), measured by different operator |
|---|---|---|---|---|---|
| None | 0 | 0.46 | 100 | <3 | <3 |
| Triton CF-10 | 0.40 | 0.56 | 98 | 3 | <3 |
| 1B | 1 | 0.56 | 102 | <3 | <3 |
| 2F | 1 | 0.21 | 99 | 4.5 | 6 |
| 2G | 1 | 0.21 | 101 | 5 | 6 |
| 2G | 0.5 | 0.28 | 96 | <3 | <3 |

TABLE 10

Open Time of A&D alkyd emulsion paint upon post-addition of stabilizer additive

| Paint code | Thickener used in paint | Sample code added stabilizer | % added stabilizer (weight on total paint) | Open Time (min), conditions (C., % RH) |
|---|---|---|---|---|
| DK100602 | | None | 0 | 4.5 (19.5° C., 55% RH) |
| | | 1A | 1 | 5 (19.5° C., 55% RH) |
| | | 1A | 1.85 | 5 (19.5° C., 55% RH) |
| | | 1B | 1 | 5 (19.5° C., 55% RH) |
| | | 1B | 2.5 | 5 (19.5° C., 55% RH) |

TABLE 11

Open Time of RC 0-VOC semi gloss paint (PVC 25) with Rovace 990 as latex upon post-addition of stabilizer additive

| Additive code | Weight % additive | Open Time Test Method (minutes) |
|---|---|---|
| None | 0 | 3 |
| Ethyleneglycol | 3 | 9 |
| 3B | 1 | 7.5 |
| 3H | 1 | 6.5 |
| 3H | 0.5 | 5.5 |
| 3G | 1 | 7 |

TABLE 12

Open Time of RC 0-VOC semi gloss paint (PVC 25) with Rhoplex ® SG30 as latex upon post-addition of stabilizer additive

| Additive code | Weight % additive | Open Time Test Method minutes |
|---|---|---|
| None | 0 | 3.8 |
| Ethyleneglycol | 3 | 10 |
| 3B | 2 | 4.7 |

TABLE 13

Open Time of RC 60 PVC paint with UCAR 300 as latex upon post-addition of stabilizer additive

| Additive code | Weight % additive | Open Time Test Method minutes |
|---|---|---|
| None | 10 | 4 |
| Ethyleneglycol | 3 | 9 |
| 4A | 2 | 7 |
| 3D | 2 | 7 |

TABLE 14

Open Time of A&D semi gloss paint upon post-addition of regular surfactant (comparison)

| Paint code | Thickener used in paint | Sample code added stabilizer | % added stabilizer (weight on total paint) | Open Time (min), conditions (° C., % RH) |
|---|---|---|---|---|
| TK 070604 C | Aquaflow ® NLS 200 rheological modifier | None | 0 | 3.5 (22° C., 50%) |
| TK 070604 C | Aquaflow ® NLS 200 rheological modifier | Triton CF-10 | 0.5 | 3.5 (22° C., 50%) |
| TK 080604 E | Natrosol ® 250 HBR HEC | none | 0 | 4 (22° C., 50%) |
| TK 080604 E | Natrosol ® 250 HBR HEC | Triton CF-10 | 0.5 | 4 (22° C., 50%) |

Triton CF 10 is a commonly used surfactant in paint, a 100% nonionic

TABLE 15

Open Time of RC 0-VOC semi gloss paint (PVC 25) upon post-addition of solvents (comparison)

| Latex used in paint | Thickener used in paint | Sample code added stabilizer | % added stabilizer (weight on latex solids) | Open Time (min) |
|---|---|---|---|---|
| Optive 130 | 10% solution of HMPE (NLS 200 type) | Archer ™ RC reactive coalescent, available from ADM Brands | 6 | 3 |
| Optive 130 | 10% solution of HMPE (NLS 200 type) | Velate ® 368 alkyl benzoate ester, available from Vesicol Chemical Corporation | 6 | 2 |
| Optive 130 | 10% solution of HMPE (NLS 200 type) | Benzoflex ® 9-88 plasticizer, available from Vesicol Chemical Corporation | 6 | 2.5 |
| Optive 130 | 10% solution of HMPE (NLS 200 type) | Benzoflex ® 2088 plasticizer, available from Vesicol Chemical Corporation | 6 | 3 |
| Optive 130 | 10% solution of HMPE (NLS 200 type) | Texanol ™ ester alcohol, available from Eastman Chemical | 6 | 2 |
| Optive 130 | 10% solution of HMPE (NLS 200 type) | Butylcarbitol | 6 | 3 |
| Optive 130 | 10% solution of HMPE (NLS 200 type) | Ethylene glycol | 6 | 4 |
| Optive 130 | 10% solution of HMPE (NLS 200 type) | None | 0 | 2.5 |

Although the invention has been illustrated by the above Examples, this is not to be construed as being limited thereby, but rather, the invention encompasses the generic area as hereinbefore disclosed. Various modifications and embodiments can be made without departing from the spirit and scope of the invention.

We claim:

1. A stabilizer composition for use in increasing Open Time of an aqueous coating composition comprising an AB type polymer, wherein B comprises a water-soluble/water dispersible oligomer or polymer and wherein A, covalently connected to B, comprises a structure that has the following formula:

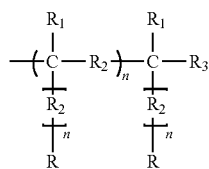

wherein R comprises a $C_1$ to $C_{30}$ hydrocarbon, which is linear or branched, aliphatic or aromatic, or combinations thereof;
$R_1$ comprises H, $CH_3$, or $C_2H_5$;
$R_2$ comprises $CH_2O$, $CO_2$, $CONH$, or $CH_2$ and wherein $R_2$ can be the same or different;
$R_3$ comprises H or OH;
n is an integer from 2 to 100; and
m is either 0 or 1;
wherein "A" is made from a monomer selected from the group consisting of polyphenoxy glycidyl ether, methylphenyl glycidyl ether, ethylhexylglycidyl ether, phenyl glycidyl ether, and alkali glycidyl ether, and wherein "B" comprises polyacetalpolyether (PAPE); and
wherein the addition of at least 0.5 wt % of the AB type polymer to an aqueous coating composition increases the Open Time of the aqueous coating composition by at least 10% Open Time, as measured by at least one of Open Time X-test A&D and Open Time X-test RC.

2. The stabilizer composition of claim 1, wherein "A" is made from methylphenyl glycidyl ether.

3. The stabilizer composition of claim 1, wherein "A" is made from ethylhexylglycidylether.

4. An aqueous coating composition comprising:
a film-forming polymer, and
a stabilizer composition comprising an AB type polymer, wherein B comprises a water-soluble/water dispersible oligomer or polymer and wherein A, covalently connected to B, comprises a structure that has the following formula:

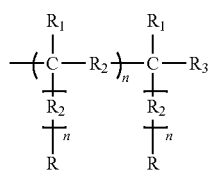

wherein R comprises a $C_1$ to $C_{30}$ hydrocarbon, which is linear or branched, aliphatic or aromatic or combinations thereof;
$R_1$ comprises H, $CH_3$, or $C_2H_5$;
$R_2$ comprises $CH_2O$, $CO_2$, $CONH$, or $CH_2$ and wherein $R_2$ can be the same or different;
$R_3$ comprises H or OH;
n is an integer from 2 to 100; and
m is either 0 or 1;
wherein "A" is made from a monomer selected from the group consisting of polyphenoxy glycidyl ether, methylphenyl glycidyl ether, ethylhexylglycidyl ether, phenyl glycidyl ether, and alkali glycidyl ether, and wherein "B" comprises polyacetalpolyether (PAPE); and
wherein the addition of at least 0.5 wt % of the AB type polymer to an aqueous coating composition increases the Open Time of the aqueous coating composition by at least 10% Open Time, as measured by at least one of Open Time X-test A&D and Open Time X-test RC.

5. The aqueous coating composition of claim 4, wherein the film-forming polymer comprises a latex.

6. The aqueous coating composition of claim 5, wherein the film-forming polymer may be selected from the group consisting of alkyl acrylates, alkoxy acrylates, alkyl methacrylates, alkoxy methacrylates, vinyl esters of saturated carboxylic acids monoolefins and conjugated dienes.

7. The aqueous coating composition of claim 4 further comprising one or more of an additional component selected from the group consisting of pigments, fillers, thickeners, biocides, mildewcides, surfactants, dispersants and defoamers.

8. The aqueous coating composition of claim 4, wherein the stabilizer composition comprises about 0.1 to about 10 wt % of the aqueous coating composition.

9. The aqueous coating composition of claim 8, wherein the stabilizer composition comprises about 0.1 to about 3 wt % of the aqueous coating composition.

10. The aqueous coating composition of claim 8, wherein the stabilizer composition comprises about 0.5 to about 1 wt % of the aqueous coating composition.

11. The aqueous coating composition of claim 4, wherein "A" comprises methylphenyl glycidyl ether.

12. The aqueous coating composition of claim 4, wherein "A" comprises ethylhexylglycidylether.

13. The aqueous coating composition of claim 4, wherein the aqueous coating composition is selected from the group consisting of paints, stains, varnishes, adhesives and inks.

14. The aqueous coating composition of claim 13, wherein the aqueous coating composition comprises a paint.

15. A method of producing an aqueous coating composition having increased Open Time comprising the steps of:
dispersing or emulsifying a film-forming polymer in an aqueous solution, and
adding an amount of a stabilizer composition to the aqueous solution to form the aqueous composition having increased Open Time, wherein the stabilizer composition comprises an AB type polymer, wherein B comprises a water-soluble/water dispersible oligomer or polymer and wherein A, covalently connected to B, comprises a structure that has the following formula:

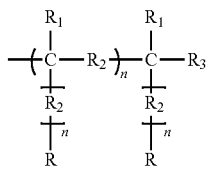

wherein R comprises a $C_1$ to $C_{30}$ hydrocarbon, which is linear or branched, aliphatic or aromatic or combinations thereof:
$R_1$ comprises H, $CH_3$, or $C_2H_5$;

$R_2$ comprises $CH_2O$, $CO_2$, CONH or $CH_2$ and wherein $R_2$ can be the same or different;

$R_3$ comprises H or OH;

n is an integer from 2 to 100; and m is either 0 or 1;

wherein "A" is made from a monomer selected from the group consisting of polyphenoxy glycidyl ether, methylphenyl glycidyl ether, ethylhexylglycidyl ether, phenyl glycidyl ether, and alkali glycidyl ether, and wherein "B" comprises polyacetalpolyether (PAPE); and wherein the addition of at least 0.5 wt % of the AB type polymer to an aqueous coating composition increase the Open Time of the aqueous coating composition by at least 10% Open Time, as measured by at least one of Open Time X-test A&D and Open Time X-test RC.

16. The method of claim 15, wherein stabilizer composition is added to the aqueous solution before the film-forming polymer is dispersed or emulsified in the aqueous solution.

17. The method of claim 15, wherein stabilizer composition is added to the aqueous solution after the film-forming polymer is dispersed or emulsified in the aqueous solution.

18. The method of claim 15, wherein stabilizer is added to the aqueous solution at the same time the film-forming polymer is dispersed or emulsified in the aqueous solution.

19. A stabilizer composition for use in increasing Open Time of an aqueous coating composition comprising a latex thickener and an AB type polymer, wherein B comprises a water-soluble/water dispersible oligomer or polymer and wherein A, covalently connected to B, comprises a structure that has the following formula:

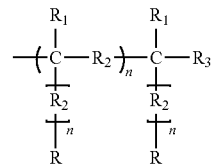

wherein R comprises a $C_1$ to $C_{30}$ hydrocarbon, which is linear or branched, aliphatic or aromatic, or combinations thereof;

$R_1$ comprises H, $CH_3$, or $C_2H_5$;

$R_2$ comprises $CH_2O$, $CO_2$, CONH, or $CH_2$, and wherein $R_2$ can be the same or different;

$R_3$ comprises H or OH;

n is an integer from 2 to 100; and m is either 0 or 1;

wherein "A" is made from a monomer selected from the group consisting of polyphenoxy glycidyl ether, methylphenyl glycidyl ether, ethylhexylglycidyl ether, phenyl glycidyl ether, and alkali glycidyl ether, and wherein "B" comprises polyacetalpolyether (PAPE); and wherein the addition of at least 0.5 wt % of the AB type polymer to an aqueous coating composition comprising a latex thickener increases the Open Time of the aqueous coating composition by at least 30% Open Time, as measured by at least one of Open Time X-test A&D and Open Time X-test RC.

* * * * *